United States Patent
Park et al.

(10) Patent No.: US 11,861,808 B2
(45) Date of Patent: Jan. 2, 2024

(54) ELECTRONIC DEVICE, IMAGE PROCESSING METHOD, AND COMPUTER-READABLE RECORDING MEDIUM

(71) Applicant: SAMSUNG ELECTRONICS CO., LTD., Suwon-si (KR)

(72) Inventors: Jaeyeon Park, Suwon-si (KR); Iljun Ahn, Suwon-si (KR); Yongsup Park, Suwon-si (KR); Tammy Lee, Suwon-si (KR); Minsu Cheon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 494 days.

(21) Appl. No.: 16/971,625

(22) PCT Filed: Feb. 20, 2019

(86) PCT No.: PCT/KR2019/002032
§ 371 (c)(1),
(2) Date: Aug. 20, 2020

(87) PCT Pub. No.: WO2019/164239
PCT Pub. Date: Aug. 29, 2019

(65) Prior Publication Data
US 2020/0394755 A1   Dec. 17, 2020

(30) Foreign Application Priority Data

Feb. 20, 2018  (KR) .......................... 10-2018-0019849

(51) Int. Cl.
*G06T 3/40*     (2006.01)
*G06N 3/08*     (2023.01)
(Continued)

(52) U.S. Cl.
CPC ............ *G06T 3/4053* (2013.01); *G06F 17/18* (2013.01); *G06N 3/08* (2013.01); *G06T 3/4007* (2013.01); *G06T 5/20* (2013.01)

(58) Field of Classification Search
USPC .................................. 382/155–156, 298–300
See application file for complete search history.

(56) References Cited

U.S. PATENT DOCUMENTS 8,472,745 B2   6/2013  Kameyama
8,805,120 B2   8/2014  Min et al.
(Continued)

FOREIGN PATENT DOCUMENTS

JP       4662099 B2     3/2011
JP       2011170456 A   9/2011
(Continued)

OTHER PUBLICATIONS 2017 14th IEEE India Council International Conference (INDICON) (pp. 1-6) A new approach for upscaling document images for improving their quality Publication Date: Dec. 1, 2017 Ram Krishna Pandey et al (Year: 2017) (Year: 2017) (Year: 2017) (Year: 2017).*
(Continued)

*Primary Examiner* — Ishrat I Sherali
(74) *Attorney, Agent, or Firm* — Sughrue Mion, PLLC

(57) ABSTRACT

An electronic device is disclosed. The electronic device of the disclosure comprises: a memory in which a learned artificial intelligence model is stored; and a processor for inputting an input image to the artificial intelligence model and outputting an enlarged image with increased resolution, wherein the learned artificial intelligence model includes an upscaling module for acquiring the pixel values of interpolated pixels around a cell according to a function having a nonlinearly decreasing symmetric form with reference to an (Continued)

original pixel in the enlarged image, the original pixel corresponding to a pixel of the input image.

13 Claims, 14 Drawing Sheets

(51) Int. Cl.
*G06F 17/18* (2006.01)
*G06T 5/20* (2006.01)

(56) References Cited

U.S. PATENT DOCUMENTS

| | | | |
|---|---|---|---|
| 9,311,691 B2 | 4/2016 | Liu | |
| 9,430,977 B2 | 8/2016 | Ooga | |
| 2003/0085912 A1* | 5/2003 | Soo | G06T 3/4007 345/698 |
| 2007/0268400 A1* | 11/2007 | Kondo | H04N 7/0125 348/E7.016 |
| 2009/0207310 A1* | 8/2009 | Arai | G06T 3/40 348/581 |
| 2010/0067820 A1 | 3/2010 | Yano | |
| 2011/0176744 A1 | 7/2011 | Ko et al. | |
| 2012/0301012 A1 | 11/2012 | Kakishita et al. | |
| 2013/0129257 A1* | 5/2013 | Hammond | H04N 7/0102 382/298 |

FOREIGN PATENT DOCUMENTS

| | | | |
|---|---|---|---|
| JP | 2012249038 A1 | 12/2012 | |
| JP | 6187932 B2 | 8/2017 | |
| KR | 1020110045650 A | 5/2011 | |
| KR | 1020110065997 A | 6/2011 | |
| KR | 20130036430 A * | 4/2013 | G06T 3/4007 |
| KR | 1020130036430 A | 4/2013 | |
| KR | 101723738 B1 | 4/2017 | |
| WO | 2017/106998 A1 | 6/2017 | |

OTHER PUBLICATIONS 2017 14th IEEE India Council International Conference (INDICON) (pp. 1-6) A new approach for upscaling document images for improving their quality Publication Date: Dec. 1, 2017 Ram Krishna Pandey et al (Year: 2017).*
International Search Report (PCT/ISA/210) dated Jun. 13, 2019 issued by the International Searching Authority in International Application No. PCT/KR2019/002032.
Written Opinion (PCT/ISA/237) dated Jun. 13, 2019 issued by the International Searching Authority in International Application No. PCT/KR2019/002032.
Getreuer, P., "Linear Methods for Image Interpolation", Image Processing on Line, vol. 1, Sep. 27, 2011, pp. 238-259.
Dong, C., et al., "Accelerating the Super-Resolution Convolutional Neural Network", ECCV 2016, arXiv:1608.00367v1 [cs.CV], Aug. 1, 2016, pp. 1-17.
Xu, L., et al., "Deep Convolutional Neural Network for Image Deconvolution", NIPS 2014, pp. 1-9.
Odena, A., et al., "Deconvolution and Checkerboard Artifacts", Distill 2016, Google, https://distill.pub/2016/deconv-checkerboard/, 12 pages.
Glasner, D., et al., "Super-Resolution from a Single Image", IEEE 2009, 8 pages.
Communication dated Apr. 21, 2023, issued by the European Patent Office in European Patent Application No. 19756620.1.
Communication dated Apr. 1, 2022 issued by the Korean Intellectual Property Office in KoreanApplication No. 10-2018-0019849.
Wenzhe Shi et al., "Real-Time Single Image and Video Super-Resolution Using an Efficient Sub-Pixel Convolutional Neural Network", 2016 IEEE Conference on Computer Vision and Pattern Recognition, Jun. 2016, pp. 1874-1883, 10 pages total, XP055768593.
Communication dated Feb. 22, 2021 issued by the European Patent Office in European Application No. 19756620.1.
Communication dated Jul. 5, 2022 by the China National Intellectual Property Administration in Chinese Patent Application No. 201980014360.8.

* cited by examiner

ELECTRONIC DEVICE, IMAGE PROCESSING METHOD, AND COMPUTER-READABLE RECORDING MEDIUM

TECHNICAL FIELD

The disclosure relates to an electronic device, an image processing method, and a computer-readable recording medium, and more particularly, to an electronic device, an image processing method, and a computer-readable recording medium for generating a high-quality image (or a high-definition image).

BACKGROUND ART

Machine learning, which is a field of artificial intelligence, refers to a technology of studying and constructing a system that collects and analyzes large-scale big data to predict the future and improves its own performance and an algorithm therefor.

Recently, due to the development of hardware technology, big data may be collected and stored, and as a computing ability and technology for analyzing big data has become sophisticated and faster, research into machine learning which is an algorithm capable of recognizing objects and understanding information like humans has been actively conducted. In particular, in the field of machine learning technology, self-learning type deep learning using a neural network has been actively researched.

A neural network, which is an algorithm that determines a final output by comparing an active function with a specific boundary value for a sum acquired by multiplying a plurality of inputs by a weight based on an intention to actively mimic functions of human brains, includes multiple layers. Typical examples thereof include a convolutional neural network (CNN), which is commonly used for image recognition, and a recurrent neural network (RNN), which is commonly used for speech recognition.

Research into improvement of image quality to increase resolution using such a deep learning network has been actively conducted. However, the existing image quality improvement method has a problem of artifacts that several lines occur in a mosaic format or at an edge when resolution increases.

Accordingly, a need for a technology of increasing resolution of an image, while reducing artifacts, has emerged.

DISCLOSURE

Technical Problem

The disclosure provides an electronic device, an image processing method, and a computer-readable recording medium for generating a high-quality image using an upscaling filter in a form of a function which is bilaterally symmetrical and nonlinearly decreases.

Technical Solution

According to an embodiment of the disclosure, an electronic device includes: a memory configured to store a learned artificial intelligence model; and a processor configured to input an input image to the artificial intelligence model and to output an enlarged image with increased resolution, wherein the learned artificial intelligence model includes an upscaling module configured to acquire a pixel value of an interpolated pixel near an original pixel corresponding to a pixel of the input image in the enlarged image based on a function in a form which is bilaterally symmetrical and nonlinearly decreases with respect to the original pixel.

In this case, the upscaling module may acquire the pixel value of the interpolated pixel near a plurality of original pixels based on each ratio of the plurality of original pixel values, and each ratio may be identified according to distances between the plurality of original pixels and the interpolated pixel on a plurality of functions based on each of the plurality of original pixels.

In this case, the plurality of original pixels may correspond to one pixel of the input image in the enlarged image, at least one of a plurality of pixels adjacent to the one pixel based on the one pixel, and a pixel corresponding to at least one of a plurality of pixels which are spaced apart to the one pixel but are adjacent to the plurality of pixels.

In this case, a variance of the function may be acquired based on a linear function for bilinear interpolation of an upscaling factor.

In this case, a variance $\sigma_d$ of the function may be acquired by $$\sigma_d(s) = sqrt\left(\frac{-d^2}{2\ln\left(\frac{-4d}{t(s)-1}+1\right)}\right),$$

where s may be the upscaling factor, d may be an x coordinate of a contact point, and t(s) may be a value acquired by adding 1 at a distance between x intercepts of the function.

In this case, the function (f(x;s)) may be $$f(x;s) = \exp\left(-\frac{x^2}{2\sigma(s)^2}\right)$$

and $\sigma_d(s)-s*0.1 \le \sigma(s) \le \sigma_d(s)+s*0.1$.

Meanwhile, the upscaling module may further include a convolution filter configured to acquire a feature of the input image, wherein the processor may acquire the enlarged image using the feature of the input image acquired using the convolution filter.

According to another embodiment of the disclosure, an image processing method includes: receiving an image; and inputting an input image to a learned artificial intelligence model and outputting an enlarged image with increased resolution, wherein the learned artificial intelligence model includes an upscaling module configured to acquire a pixel value of an interpolated pixel near an original pixel corresponding to a pixel of the input image in the enlarged image based on a function in a form which is bilaterally symmetrical and nonlinearly decreases with respect to the original pixel.

In this case, the upscaling module may acquire the pixel value of the interpolated pixel near a plurality of original pixels based on each ratio of the plurality of original pixel values, and each ratio may be identified according to distances between the plurality of original pixels and the interpolated pixel on a plurality of functions based on each of the plurality of original pixels.

In this case, the plurality of original pixels may correspond to one pixel of the input image in the enlarged image, at least one of a plurality of pixels adjacent to the one pixel based on the one pixel, and a pixel corresponding to at least one of a plurality of pixels which are spaced apart to the one pixel but are adjacent to the plurality of pixels.

In this case, a variance of the function may be acquired based on a linear function for bilinear interpolation of an upscaling factor.

In this case, a variance $\sigma_d$ of the function may be acquired by $$\sigma_d(s) = sqrt\left(\frac{-d^2}{2\ln\left(\frac{-4d}{t(s)-1}+1\right)}\right),$$

where s may be the upscaling factor, d may be an x coordinate of a contact point, and t(s) may be a value acquired by adding 1 at a distance between x intercepts of the function.

In this case, the function (f(x;s)) may be $$f(x;s) = \exp\left(-\frac{x^2}{2\sigma(s)^2}\right)$$

and $\sigma_d(s)-s*0.1 \leq \sigma(s) \leq \sigma_d(s)+s*0.1$.

Meanwhile, the upscaling module may further include a convolution filter configured to acquire a feature of the input image, wherein the processor may acquire the enlarged image using the feature of the input image acquired using the convolution filter.

According to another embodiment of the disclosure, a computer-readable recording medium including a program for executing an image processing method, wherein the image processing method includes: receiving an image; and inputting an input image to a learned artificial intelligence model and outputting an enlarged image with increased resolution, wherein the learned artificial intelligence model includes an upscaling module configured to acquire a pixel value of an interpolated pixel near an original pixel corresponding to a pixel of the input image in the enlarged image based on a function in a form which is bilaterally symmetrical and nonlinearly decreases with respect to the original pixel.

BEST MODES

Figure 1:
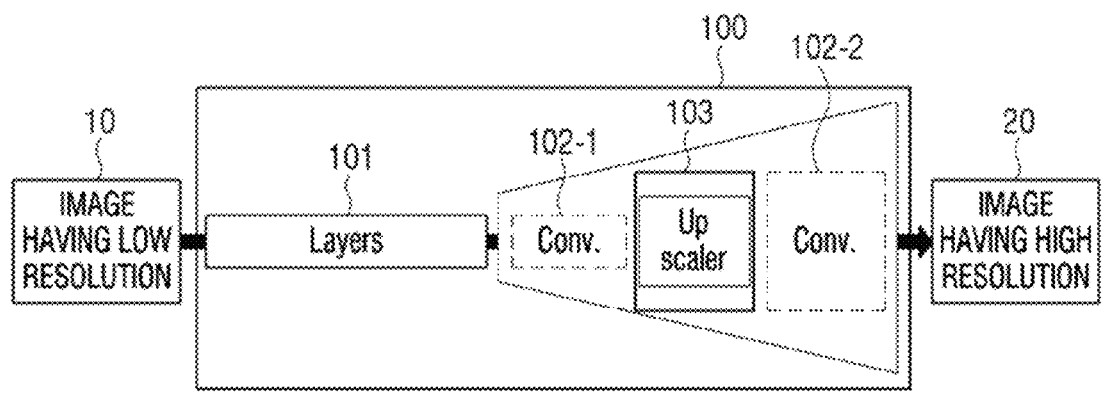
FIG. 1 is a view schematically illustrating an image processing process of an electronic device according to an embodiment of the disclosure.

Terms used in the description of the various example embodiments of the disclosure are briefly described and then the various example embodiments of the disclosure will be described in greater detail.

The terms used in the example embodiments of the disclosure are general terms which are widely used now and selected considering the functions of the disclosure. However, the terms may vary depending on the intention of a person skilled in the art, a precedent, or the advent of new technology. In addition, in a specified case, the term may be arbitrarily selected. In this case, the meaning of the term will be explained in the corresponding description. Therefore, terms used in the disclosure may be defined based on a meaning of the terms and contents described in the disclosure, not simply based on names of the terms.

Various embodiments of the disclosure are described with reference to the accompanying drawings. However, it should be appreciated that the disclosure is not limited to a specific embodiment and all modifications, equivalents and/or alternatives thereof also belong to the scope of the disclosure. Descriptions of well-known functions and structures incorporated herein may be omitted to avoid obscuring the subject matter of the disclosure.

In the disclosure, terms including an ordinal number such as 'first', 'second', etc. may be used to describe various components, but the components are not to be construed as being limited to the terms. The terms are only used to differentiate one component from other components.

As used herein, the singular forms are intended to include the plural forms as well, unless the context clearly indicates otherwise. It will be understood that the terms "comprising", "including", "having" and variants thereof specify the presence of stated features, numbers, steps, operations, elements, components, and/or groups thereof, but do not preclude the presence or addition of one or more other features, numbers, steps, operations, elements, components, and/or groups thereof.

In the description, the word "module" or "unit" refers to a software component a hardware component or a combination thereof, which is capable of carrying out at least one function or operation. A plurality of modules or units may be integrated into at least one module and realized using at least one processor except for those modules or units that need to be realized in specific hardware.

Hereinafter, embodiments will be described in detail with reference to the accompanying drawings such that they can be easily practiced by those skilled in the art to which the disclosure pertains. As those skilled in the art would realize, the described embodiments may be modified in various different ways, all without departing from the spirit or scope of the disclosure. In the accompanying drawings, a portion irrelevant to description of the disclosure will be omitted for clarity. Like reference numerals refer to like elements throughout.

Hereinafter, the disclosure will be described in more detail with reference to the drawings.

FIG. 1 is a view schematically illustrating an image processing process of an electronic device according to an embodiment of the disclosure.

Referring to FIG. 1, when an input image 10 is input to the electronic device 100, the electronic device 100 may sequentially perform a series of image processing processes and output an enlarged image 20. In this case, the input image 10 being input may be a low-resolution image acquired by processing an original image.

Here, the electronic device 100 may be a device capable of performing artificial intelligence learning. For example, the electronic device 100 may be a desktop PC, a notebook computer, a smartphone, a tablet PC, a server, or the like. Alternatively, the electronic device 100 may refer to a system in which a cloud computing environment is built. However, the disclosure is not limited thereto, and the electronic device 100 may be any device capable of performing artificial intelligence learning.

Specifically, the electronic device 100 may include a plurality of layers 101 extracting features of the input image 10 and an upscaling module 103 upscaling the input image 10 using the extracted features.

Here, the plurality of layers 101 may extract features of the input image 10 using a plurality of filters trained by a neural network. That is, the plurality of layers 101 may perform pre-processing before upscaling.

Here, the filters are masks having weights and is defined as a matrix of weights. The filters are also referred to as windows or kernels. The weights configuring the matrix in the filters may include 0 (zero value) or a zero element that may be approximated to 0 and a non-zero element having a certain value between 0 and 1 and may have various patterns according to functions thereof.

For example, when the neural network is realized as a convolution neural network (CNN) for recognizing an image, the electronic device 100 may put the filters having weights on the input image 10 and determine the sum (convolution operation) of values acquired by multiplying the image by each of the weights of the filters, as a pixel value of the output image, to extract a feature map. The input image may be extracted as a plurality of input images through multiple filters to extract robust features, and a plurality of feature maps may be extracted according to the number of filters. Such a convolutional image may be repeated by multiple layers. Here, the filters to be trained vary depending on a learning target of the CNN and patterns of selected filters vary. In other words, the trained filters and the selected filters vary depending on what a learning target of the CNN is cat, dog, pig, cow, and the like.

In this manner, the electronic device 100 may determine what type of features the input original data has by combining the plurality of layers 101 from which different features may be extracted and applying a combination of the plurality of layers to the CNN.

The electronic device 100 may output an enlarged image by inputting a feature map of the input image 10 extracted from the plurality of layers 101 to the upscaling module 103.

Meanwhile, the upscaling module 103 may optionally further include convolutional layers 102-1 and 102-2 ahead and behind. In this case, the upscaling module 103 may be referred to by including the convolutional layers 102-1 and 102-2. In this case, the convolutional layers 102-1 and 102-2 may be a convolutional layer or a combination of a convolutional layer and a ReLu layer.

Further, the electronic device 100 may learn parameters of the plurality of layers 101 or the convolutional layers 102-1 and 102-2 by comparing the output enlarged image 20 and the original image.

Meanwhile, the upscaling module 103 may increase resolution of an image using a filter in the form of a function that is bilaterally symmetrical and decreases nonlinearly. For example, the upscaling module 103 may be in the form of a Gaussian function. For convenience of description below, the upscaling module in the disclosure is described as a Gaussian function, but is not limited thereto. Details of the upscaling module 103 will be described with reference to the accompanying drawings.

Figure 2:
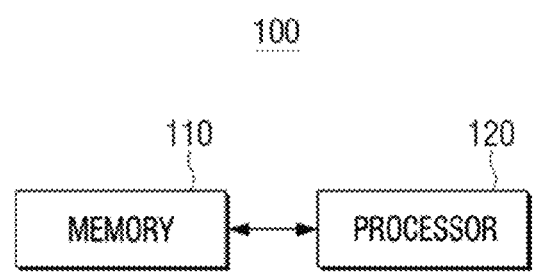
FIG. 2 is a block diagram illustrating a simple configuration of an electronic device according to an embodiment of the disclosure.

FIG. 2 is a block diagram illustrating a simplified configuration of an electronic device according to an embodiment of the disclosure.

Referring to FIG. 2, the electronic device 100 includes a memory 110 and a processor 120.

The memory 110 may be realized as a memory of various formats such as a hard disk drive (HDD), a solid state drive (SSD), a DRAM memory, an SRAM memory, an FRAM memory, or a flash memory.

Specifically, an artificial intelligence model may be stored in the memory 110. Here, the artificial intelligence model may be learned. In addition, the artificial intelligence model may include an upscaling module for increasing the resolution of the input image.

Specifically, the upscaling module is a module for acquiring a pixel value of an original pixel corresponding to a pixel of the input image in the enlarged image and a pixel value of an interpolated pixel near the original pixel. Here, the upscaling module may acquire the pixel value of the interpolated pixel near the original pixel according to a function in a form which is bilaterally symmetrical and decreases nonlinearly with respect to the original pixel under the control of the processor 120. For example, the upscaling module may be in the form of a Gaussian function based on the original pixel.

The processor 120 generally controls the operation of the electronic device 100.

According to an embodiment, the processor 120 may be realized as a digital signal processor (DSP), a microprocessor, or a time controller (TCON). However, without being limited thereto, the processor 120 may include at least one of a central processing unit (CPU), a microcontroller unit (MCU), a micro processing unit (MPU), a controller, an application processor (AP), a communication processor (CP), or an ARM processor or may be defined by the corresponding term. In addition, the processor 120 may be realized as a system on chip (SoC) or large scale integration (LSI) with a built-in processing algorithm or may be realized in the form of a field programmable gate array (FPGA).

The processor 120 may output the enlarged image of the input image using the upscaling module included in the artificial intelligence model stored in the memory 110. Specifically, the processor 120 may acquire the pixel value of the interpolated pixel near the original pixel according to the function which is bilaterally symmetrical and nonlinearly decreases with respect to the original pixel corresponding to the pixel of the input image using the upscaling module stored in the memory 110, and output the enlarged image based on the acquired pixel values. For example, the upscaling module may be in the form of a Gaussian function based on the original pixel. Details of the original pixel and the interpolated pixel will be described with reference to FIG. 4 below.

Specifically, the upscaling module used by the processor 120 may acquire the pixel value of interpolated pixel near a plurality of original pixels based on each ratio of the plurality of original pixel values. That is, the processor 120 acquires a pixel value of one interpolated pixel using the upscaling module, and to this end, the processor 120 may use pixel values of the plurality of original pixels around the interpolated pixel. Meanwhile, the processor 120 may acquire the pixel value of the interpolated pixel using the plurality of pixel values respectively corresponding to the plurality of original pixels in the input image.

Specifically, the processor 120 may identify a reflection ratio of the pixel value of the original pixel according to distances between the interpolated pixel and the plurality of original pixels around the interpolated pixel. In this case, the plurality of original pixels may be pixels corresponding to a first pixel of the input image, a second pixel which is at least one of a plurality of pixels adjacent to the first pixel based on the first pixel, and a third pixel which is at least one of a plurality of pixels which are spaced apart from the first pixel but adjacent to the second pixel, in the enlarged image.

Specifically, the processor 120 may identify a ratio reflecting the pixel value of the original pixel on the Gaussian function with respect to the original pixel according to the distance of the interpolated pixel to the original pixel. Here, variance of the Gaussian function may be acquired based on an upscaling factor. Specifically, the variance of the Gaussian function may be acquired based on a slope of a linear function for bilinear interpolation of the upscaling factor. A process of acquiring the variance of the Gaussian function will be described in detail below with reference to FIGS. 6 and 7.

Meanwhile, a reflection ratio of a pixel value of an original pixel other than the original pixel adjacent to the interpolated pixel may be identified on the Gaussian function with respect to the other original pixel according to a distance between the interpolated pixel and the other original pixel.

The pixel value reflection ratio as described above may also be applied between the original pixels. Specifically, a pixel value of a first original pixel in the enlarged image will affect a pixel value of an adjacent second original pixel, and thus, when the pixel value of the second original pixel is acquired, the processor 120 may identify the ratio at which the pixel value of the first original pixel is reflected on the Gaussian function based on the first original pixel according to a distance between the first original pixel and the second original pixel and acquire the pixel value of the second original pixel using the identified ratio.

The method of acquiring the pixel value of the enlarged image as described above will be described in detail below with reference to FIGS. 6 and 9.

Figure 3:
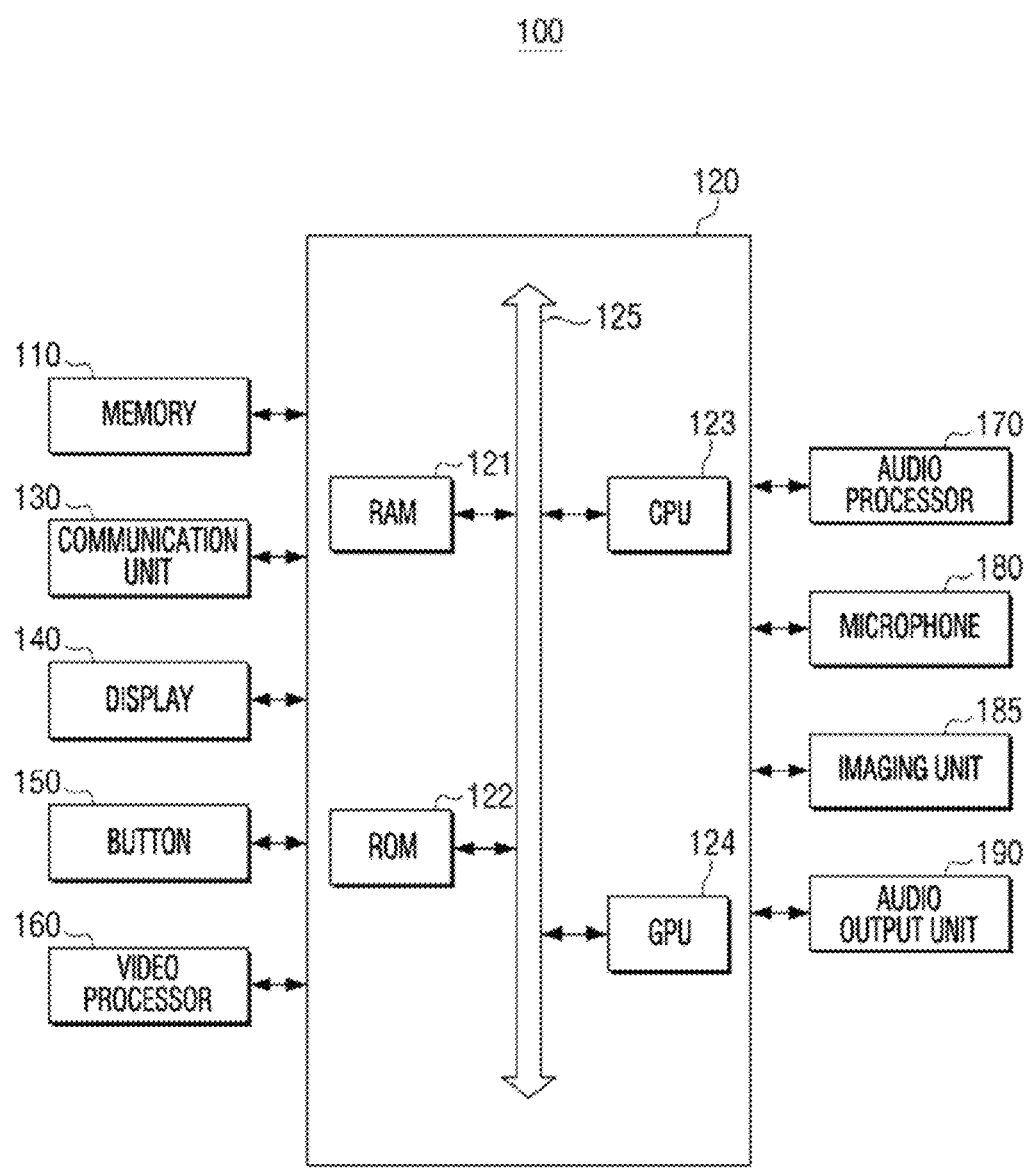
FIG. 3 is a block diagram illustrating a specific configuration of the electronic device disclosed in FIG. 2.

FIG. 3 is a block diagram illustrating a specific configuration of the electronic device disclosed in FIG. 2.

Referring to FIG. 3, the electronic device 100 may include a memory 110, a processor 120, a communication unit 130, a display 140, a button 150, a video processor 160, an audio processor 170, a microphone 180, an imaging unit 185, and an audio output unit 190.

Here, the memory 110 and the processor 120 are the same as those shown in FIG. 1, and redundant descriptions are omitted.

The memory 110 may store various programs and data necessary for the operation of the electronic device 100.

Specifically, a parameter for processing the input image may be stored in the memory 110. Here, the stored parameter may be machine-learned based on a previously input low-quality image and a high-quality image corresponding thereto.

In addition, the memory 110 may store a reduction ratio for use in reducing the input image. Here, the stored reduction ratio, which is calculated by a manufacturer through machine learning, may be previously stored at the factory or may be updated through periodic firmware upgrading. Meanwhile, the memory 110 may store an algorithm for deriving the reduction ratio.

In addition, the memory 110 may store a plurality of low-quality images to be upscaled to high-quality images. The processor 120 may generate a high-quality image for a low-quality image selected by a user from among the plurality of stored low-quality images.

In addition, the memory 110 may store information on a reduction ratio corresponding to the degree of deterioration of an image. Here, the reduction ratio based on the degree of deterioration may be stored in the form of a lookup table.

In addition, the memory 110 may store programs and data for upscaling a low-quality image. Accordingly, the processor 120 may generate a high-quality image from the input low-quality image using the program and data stored in the memory 110, and in some cases, the processor 120 may determine a reduction ratio used in a parameter updating process or an upscaling process.

The communication unit 130 is a component for performing communication with various types of external devices according to various types of communication methods. Specifically, the communication unit 130 may receive a low-quality image from an external device and transmit a high-quality image generated by the processor 120 to an external device such as a separate display device. In addition, the communication unit 130 may also receive an original image which is a high-quality image corresponding to the low-quality image.

Specifically, the communication unit 130 may receive an image from an external device through a wired method such as an antenna, a cable, or a port or may receive an image through a wireless method such as Wi-Fi and Bluetooth. Meanwhile, in actual realization, the electronic device 100 may receive an image selected by the user from among a plurality of images stored in a storage unit (not shown) provided in the electronic device 100 and process the image.

When the electronic device 100 is capable of performing wireless communication, the communication unit 130 may include a Wi-Fi chip, a Bluetooth chip, a wireless communication chip, and an NFC chip. Specifically, the Wi-Fi chip and the Bluetooth chip perform communication in a Wi-Fi method and a Bluetooth method, respectively. In case of using the Wi-Fi chip or the Bluetooth chip, various connection information such as an SSID and a session key may be first transmitted and received, and various types of information may be transmitted and received, connection may be established using the various connection information, and various information may then be transmitted and received. The wireless communication chip refers to a chip that performs communication according to various communication standards such as IEEE, Zigbee, 3rd generation (3G), 3rd generation partnership project (3GPP), and long term evolution (LTE). The NFC chip refers to a chip that operates in a near field communication (NFC) method using a 13.56 MHz band among various RF-ID frequency bands such as 135 kHz, 13.56 MHz, 433 MHz, 860 to 960 MHz, and 2.45 GHz.

The display 140 may display an image acquired by processing the input image using an adjusted parameter. Here, the processed image displayed by the display 140 may be an image generated by improving image quality of the input image with the adjusted parameter. The display 140 may be realized as various types of displays such as a liquid crystal display (LCD), an organic light emitting diodes (OLED) display, and a plasma display panel (PDP). The display 140 may include a driving circuit, a backlight unit, and the like, which may be realized in the form of an a-si TFT, a low temperature polysilicon (LTPS) TFT, an organic TFT (OTFT), or the like. Also, the display 140 may be realized as a flexible display.

In addition, the display 140 may include a touch sensor for detecting a user's touch gesture. The touch sensor may be realized as various types of sensors such as capacitive, resistive, and piezoelectric sensors. The capacitive type is a method of calculating touch coordinates by sensing microelectricity excited to the user's body when a part of the user's body touches a surface of the display 140 using a dielectric coated on the surface of the display. The resistive type, which includes two electrode plates embedded in the display 140, is a method of calculating touch coordinates by sensing a current flowing as upper and lower plates at a touched point are in contact with each other when the user touches a screen. In addition, if the electronic device 100 supports a pen input function, the display 140 may detect a user's gesture using an input unit such as a pen in addition to the user's finger. If the input unit is a stylus pen including a coil therein, the electronic device 100 may include a magnetic field detection sensor capable of detecting a magnetic field changed by a coil inside the stylus pen. Accordingly, the display 140 may detect even a proximity gesture, i.e., hovering, as well as a touch gesture.

Meanwhile, it has been described that the display function and the gesture detection function are performed in the same component, but the display function and the gesture detection function may be performed in different components. In addition, according to various embodiments, the display 140 may not be provided in the electronic device 100.

The processor 120 may include a RAM 121, a ROM 122, a CPU 123, a graphic processing unit (GPU) 124, and a bus 125. The RAM 121, the ROM 122, the CPU 123, the GPU 124, and the like may be connected to each other through the bus 125.

The CPU 123 accesses the memory 110 and performs booting using an operating system (O/S) stored in the memory 110. In addition, the CPU 123 performs various operations using various programs, contents, data, and the like stored in the memory 110.

The ROM 122 stores an instruction set for system booting. When a turn-on command is input and power is supplied, the CPU 123 copies the O/S stored in the storage unit 140 to the RAM 121 according to a command stored in the ROM 122 and executes the O/S to boot the system. When booting is completed, the CPU 123 copies various programs stored in the storage unit 140 to the RAM 121 and executes the programs copied to the RAM 121 to perform various operations.

When the booting of the electronic device 100 is completed, the GPU 124 displays a user interface (UI) on the display 140. Specifically, the GPU 124 may generate a screen including various objects such as an icon, an image, text, and the like using a calculation unit (not shown) and a rendering unit (not shown). The calculation unit calculates attribute values such as coordinate values where each object is to be displayed, shapes, sizes, colors, and the like of each object according to a layout of the screen. The rendering unit generates screens of various layouts including objects based on the attribute values calculated by the calculation unit. The screen (or a UI window) generated by the rendering unit is provided to the display 140 and displayed in each of a main display area and a sub-display area.

The button 150 may be various types of buttons such as a mechanical button, a touch pad, a wheel, and the like formed in a certain area such as a front portion, a side portion, or a rear portion of the exterior of a main body of the electronic device 100.

The video processor 160 is a component for processing content received through the communication unit 130 or video data included in the content stored in the memory 110. The video processor 160 may perform various image processing such as decoding, scaling, noise filtering, frame rate conversion, resolution conversion, and the like on video data.

The audio processor 170 is a component for processing the content received through the communication unit 130 or audio data included in the content stored in the memory 110. The audio processor 170 may perform various processing such as decoding, amplification, noise filtering, or the like on audio data.

When a playback application for multimedia content is executed, the processor 120 may drive the video processor 160 and the audio processor 170 to play the corresponding content. Here, the display 140 may display an image frame generated by the video processor 160 on at least one of the main display area or the sub-display area.

The audio output unit 190 outputs audio data generated by the audio processor 170.

The microphone 180 is a component for receiving a user's voice or other sound and converting the received user's voice or the sound into audio data. The processor 120 may use the user's voice input through the microphone 180 during a call process or convert the user's voice into audio data and store the converted audio data in the memory 110. Meanwhile, the microphone 180 may be configured as a stereo microphone that receives sound input at a plurality of locations.

The imaging unit 185 is a component for capturing a still image or a video according to the user's control. The imaging unit 185 may be provided in plurality such as a front camera and a rear camera. As described above, the imaging unit 185 may be used as a unit for acquiring an image of the user in an embodiment for tracking a user's gaze.

When the imaging unit 185 and the microphone 180 are provided, the processor 120 may perform a control operation according to the user's voice input through the microphone 180 or the user's motion recognized by the imaging unit 185. That is, the electronic device 100 may operate in a motion control mode or a voice control mode. When operating in the motion control mode, the processor 120 activates the imaging unit 185 to capture an image of the user, tracks a change in the user's motion, and performs a corresponding control operation. When operating in the voice control mode, the processor 120 may operate in a voice recognition mode to analyze the user's voice input through the microphone 180 and perform a control operation according to the analyzed user's voice.

In the electronic device 100 supporting the motion control mode or the voice control mode, a voice recognition technology or a motion recognition technology may be used in various embodiments described above. For example, when the user takes a motion as if selecting an object displayed on a home screen or utters a voice command corresponding to the object, it is determined that the object is selected and a control operation matched to the object may be performed.

In addition, although not shown in FIG. 3, according to an embodiment, the electronic device 100 may further include a USB port to which a USB connector may be connected, external input port to be connected to various external terminals such as a headset, a mouse, a LAN, and the like, a digital multimedia broadcasting (DMB) chip that receives and processes a DMB signal, various sensors, and the like.

Figure 4:
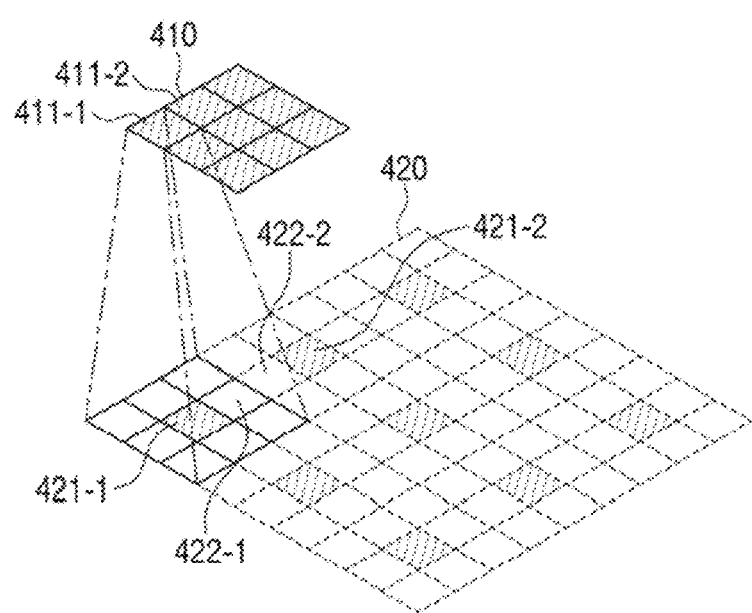
FIG. 4 is a diagram illustrating an image processing method for increasing resolution of an image.

FIG. 4 is a view illustrating an image processing method of increasing resolution of an image. Specifically, in FIG. 4, as an example, it is assumed that an input image 410 of 3 by 3 is input to an upscaling module having a scaling factor of 3 and an enlarged image 420 of 9 by 9 is acquired.

Referring to FIG. 4, a pixel of (1,1) of the input image 410 is referred to as a first pixel 411-1 and a pixel of (1,2) is referred to as a second pixel 411-2.

Here, if a pixel corresponding to a pixel of the input image 410 among a plurality of pixels of the enlarged image 420 is referred to as an original pixel, a pixel of (2,2) in the enlarged image 420 may be a first original pixel 421-1 to which the first pixel 411-1 corresponds. Also, a second original pixel 421-2 of the enlarged image 420 corresponding to the second pixel 411-2 adjacent to the first pixel 411-1 of the input image 410 may be a pixel of (2,5).

Meanwhile, in addition to the original pixel corresponding to the pixels of the input image 410 among the plurality of pixels included in the enlarged image 420, a pixel near the original pixel may be referred to as an interpolated pixel. Specifically, among the pixels between the first original pixel 421-1 and the second original pixel 421-2 corresponding to the pixels of the input image 410 in the enlarged image 420, an interpolated pixel adjacent to the first original pixel 421-1 may be referred to as a first interpolated pixel 422-1 and an interpolated pixel adjacent to the first interpolated pixel 422-1 may be referred to as a second interpolated pixel 422-2, and here, the second interpolated pixel 422-2 may be adjacent to the second original pixel 421-2.

In FIG. 4, a center pixel among the plurality of pixels included in the region in which one pixel of the input image 410 is upscaled is illustrated as the original pixel, but another pixel other than the center pixel in the upscaled region may also be set as the original pixel.

Meanwhile, the electronic device 100 may acquire pixel values of the original pixel and interpolated pixels of the enlarged image 420 by using the pixel values of the pixels of the input image 410. Specifically, the electronic device 100 may acquire pixel values of the original pixel, the interpolated pixel near the original pixel, and another original pixel according to a Gaussian function based on the original pixel in the enlarged image 420. Specifically, the electronic device 100 may acquire a pixel value of each pixel by identifying a reflection ratio of the pixel value of the original pixel according to a distance to the original pixel on a Gaussian function.

A specific method of acquiring pixel values of a plurality of pixels configuring the enlarged image 420 will be described in detail below with reference to FIGS. 6 and 9.

Figure 5:
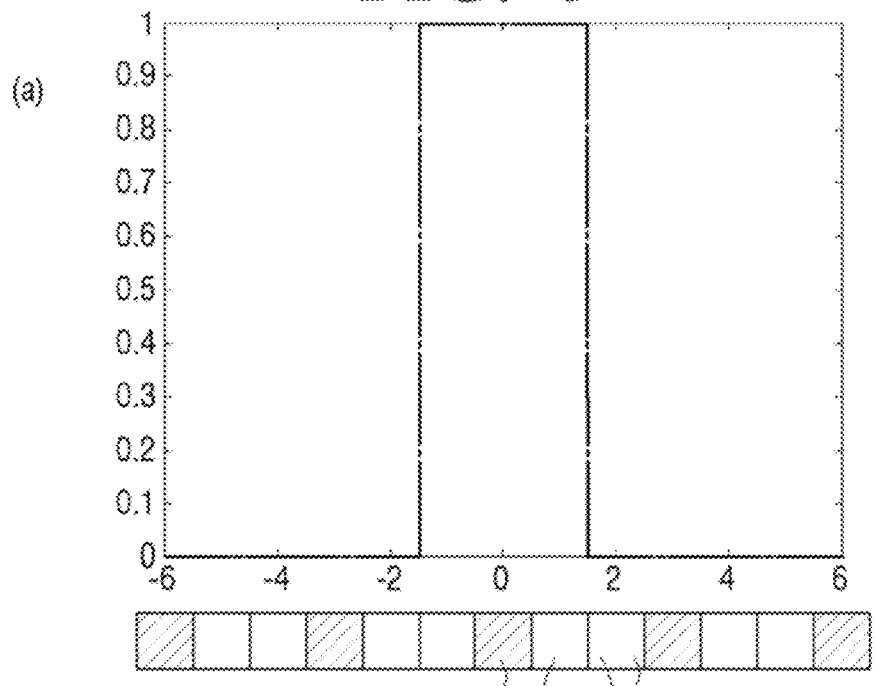
FIG. 5 is a view illustrating an interpolation method in an image processing method of the related art.
Figure 5:
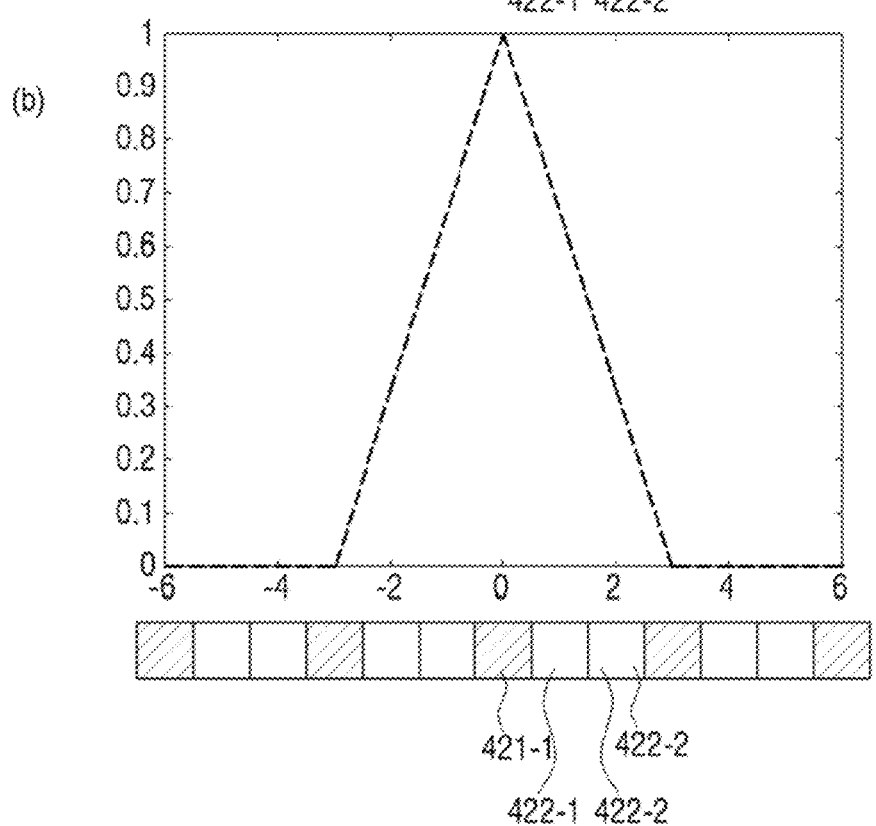

FIG. 5 is a view illustrating an interpolation method in an image processing method of the related art.

Specifically, FIG. 5A illustrates a filter of a nearest neighbor method and FIG. 5B illustrates a filter of a bilinear interpolation method. In both methods, it is assumed that a scaling factor is 3.

Referring to FIG. 5A, the nearest neighbor method is a method of acquiring a pixel value of an interpolated pixel adjacent to an original pixel to be equal to a pixel value of the original pixel. Specifically, according to the nearest neighbor method, a pixel value of the first interpolated pixel 422-1 adjacent to the first original pixel 421-1 may be acquired as a pixel value of the first original pixel 421-1. Also, a pixel value of the second interpolated pixel 422-2 adjacent to the second original pixel 421-2 may be acquired as a pixel value of the second original pixel 421-2.

In other words, according to the nearest neighbor method, the pixel value of the second original pixel 421-2 which is not adjacent is not considered in acquiring the pixel value of the first interpolated pixel 422-1. In addition, there is a problem in that mosaic-shaped checkboard artifacts may be formed in the enlarged image due to the boundary between the first interpolated pixel 422-1 and the second interpolated pixel 422-2 based on a difference between the pixel value of the first interpolated pixel 422-1 and the pixel value of the second interpolated pixel 422-2.

Also, referring to FIG. 5B, the bilinear interpolation method is a method of acquiring a pixel value of an interpolated pixel using values of a plurality of original pixels around the interpolated pixel and determining a reflection ratio of the pixel values of the plurality of original pixels according to a linear function. Here, a y-intercept of the linear function may be 1 (which means that all pixel values of the original pixels are reflected) and a slope may be a reciprocal of a scaling factor. Accordingly, a slope of the linear function of the right area may be −⅓ and a slope of the linear function of the left area may be ⅓ based on the first original pixel. Because the slope of the linear function is identified by the scaling factor, the slope of the linear function may also vary if the scaling factor is different.

Specifically, according to the bilinear interpolation method, the pixel value of the first interpolated pixel 422-1 adjacent to the first original pixel 421-1 may be acquired as a pixel value of the first original pixel 421-1 and as a pixel value of the second original pixel 421-2. Specifically, the pixel value of the first interpolated pixel 422-1 may be acquired based on a reflection ratio of the pixel value of the first original pixel 421-1 and the pixel value of the second original pixel 421-2 based on the distance between the first original pixel 421-1 and the second original pixel 421-2.

For example, referring to FIG. 5B, a distance between the first interpolated pixel 422-1 and the first original pixel 421-1 is one pixel. Accordingly, the electronic device may acquire the pixel value of the first interpolated pixel 422-1 by reflecting ⅔ of the pixel value of the first original pixel 421-1 according to a linear function based on the first original pixel 421-1 shown in FIG. 5B.

Although not shown, the electronic device may acquire a ratio in which the pixel value of the second original pixel 421-2 is reflected on the pixel value of the first interpolated pixel 422-1 in the same manner. Specifically, a distance between the first interpolated pixel 422-1 and the second original pixel 421-2 is two pixels. Accordingly, the electronic device may acquire the pixel value of the first interpolated pixel 422-1 by reflecting ⅓ of the pixel value of the second original pixel 421-2 according to a linear function based on the second original pixel 421-2.

In conclusion, the electronic device may acquire the pixel value of the first interpolated pixel 422-1 using ⅔ of the pixel value of the first original pixel 421-1 and ⅓ of the pixel value of the second original pixel 421-2.

The electronic device may acquire the pixel value of the second interpolated pixel 422-2 using ⅓ of the pixel value of the first original pixel 421-1 and ⅔ of the pixel value of the second original pixel 421-2 in the same manner.

In other words, according to the bilinear interpolation method, in acquiring the pixel value of the first interpolated pixel 422-1, the pixel values of the two closest original pixels 421-1 and 421-2 are considered but the pixel value of the original pixel which is farther is not considered. In addition, in case of the bilinear interpolation method, there is a problem in that ringing artifacts occur in a region with a high frequency and an edge region in which a pixel value changes rapidly is not clear.

Figure 6:
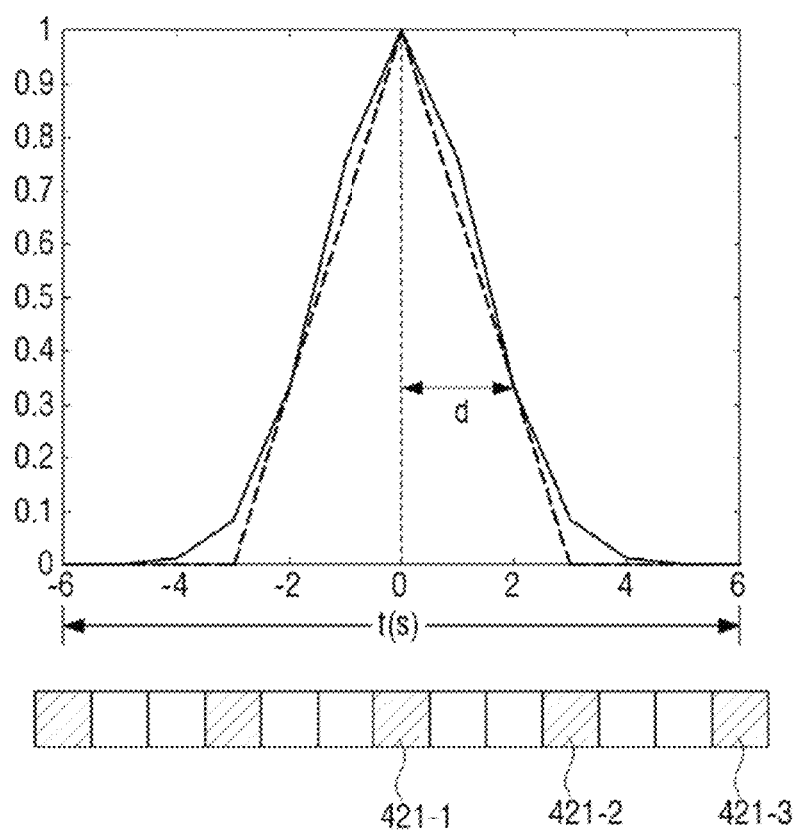
FIG. 6 is a view illustrating an interpolation method in an image processing method according to an embodiment of the disclosure.

FIG. 6 is a view illustrating an interpolation method in an image processing method according to an embodiment of the disclosure. Specifically, FIG. 6 shows a Gaussian function based on the first original pixel 421-1 in the enlarged image among a plurality of Gaussian functions included in the upscaling module. Here, it is assumed that the upscaling factor is 3.

Referring to FIG. 6, a Gaussian function 620 based on the first original pixel 421-1 defines a ratio in which the pixel value of the first original pixel 421-1 is defined according to a distance to the first original pixel 421-1. In other words, the x axis of the Gaussian function 620 refers to a distance between one pixel in the enlarged image and the first original pixel 421-1, which is a reference pixel, and the y-axis represents a ratio in which the pixel value of the first original pixel 421-1 is reflected according to distances. Here, because the Gaussian function 620 is two-dimensional, the pixels expressed in the Gaussian function 620 may be in the same row or the same column. Here, the Gaussian function 620 is bilaterally symmetrical with respect to the first original pixel 421-1 and may have a shape that decreases nonlinearly away from the first original pixel 421-1.

Meanwhile, variance of the Gaussian function 620 according to the disclosure may be acquired based on the upscaling factor. Specifically, the variance of the Gaussian function 620 according to the disclosure may be acquired based on a linear function 610 for bilinear interpolation of the same upscaling factor. Specifically, the variance of the Gaussian function 620 according to the disclosure may be acquired to form a point of contact with the linear function 610 for bilinear interpolation. Here, an absolute value of a slope of the linear function 610 may be a reciprocal (⅓ or −⅓) of the upscaling factor.

Accordingly, the variance of the Gaussian function 620 according to the disclosure may be acquired based on Equation 1 as follows.

$$\sigma_d(s) = sqrt\left(\frac{-d^2}{2\ln\left(\frac{-4d}{t(s)-1}+1\right)}\right) \quad \text{[Equation 1]}$$

Here, $\sigma_d$ is the variance of the Gaussian function 620, s is the upscaling factor, d is the x-coordinate of the point of contact of the linear function 610 and the Gaussian function 620, and t(s) may be a value acquired by adding 1 to the distance between x intercepts of the Gaussian function.

Here, t(s) may refer to a size of the Gaussian function 620 and may be acquired based on Equation 2 below.

$$t(s)=s*4+1 \quad \text{[Equation 2]}$$

Here, s denotes the upscaling factor, and Equation 2 may be based on a user's setting. In other words, the size of the Gaussian function 620 is not limited to Equation 2 described above and may be adjusted according to a user's setting.

As described above, according to the disclosure, by identifying the pixel value reflection ratio of the reference pixel according to the Gaussian function, the pixel value of the reference pixel may be reflected even when acquiring the pixel value of the pixel at a distance greater than that of the related art. That is, compared with the related art in which an enlarged image is generated by reflecting only pixel values of adjacent pixels, pixel values of pixels in a wider range including separated pixels are reflected, thereby generating a more improved enlarged image.

Figure 7:
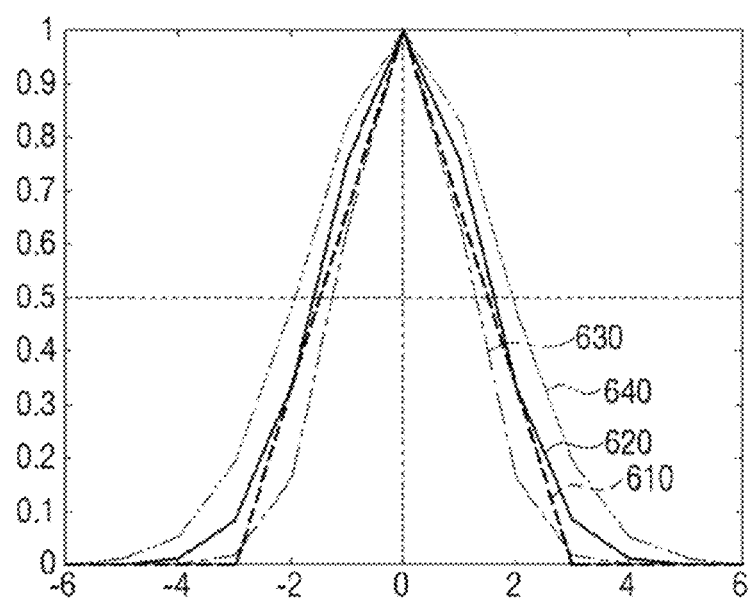
FIG. 7 is a view illustrating a range of variance of a Gaussian function.

FIG. 7 is a view illustrating a range of variance of a Gaussian function. Specifically, FIG. 7 is a view illustrating a variable range of the variance of the Gaussian function 620 acquired based on the linear function 610 for bilinear interpolation as shown in FIG. 6.

Referring to FIG. 7, the Gaussian function 620 may be acquired to have a point of contact with the linear function 610 for bilinear interpolation. Hereinafter, for convenience of description, the Gaussian function having a point of contact with the linear function 610 will be referred to as a first Gaussian function 620. Here, the variance $\sigma_d$ of the first Gaussian function 620 may be acquired based on Equation 1 described above.

Meanwhile, the electronic device may change the variance of the Gaussian function based on the variance ad of the first Gaussian function 620. Specifically, the electronic device may set a range of variance so that a full width at half maximum (FWHM) of the Gaussian function does not deviate significantly compared to a FWHM of the linear function 610 for bilinear interpolation. Here, the FWHM, a term representing a width of a function, may refer to a difference between two variables in which a function value becomes half of a maximum value of the function.

Specifically, the Gaussian function may be acquired by Equation 3 below.

$$f(x;s) = \exp\left(-\frac{x^2}{2\sigma(s)^2}\right) \quad \text{[Equation 3]}$$

Here, the range of the Variance may be $\sigma_d(s)-s*0.1 \leq \sigma(s) \leq \sigma_d(s)+s*0.1$.

Based on the range of the variance described above, the Gaussian function having a minimum variance value may be in the form of a second Gaussian function 630, and the Gaussian function having a maximum variance value may be in the form of a third Gaussian function 640.

Figure 9:
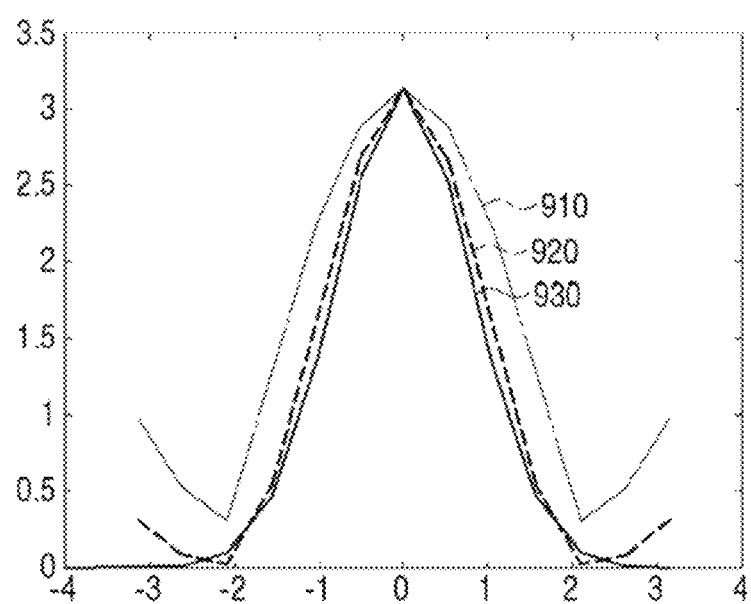

Meanwhile, as shown in FIG. 9 below, the range of the variance described above may be a range set so that artifacts do not occur in a high frequency region of a frequency domain.

Figure 8:
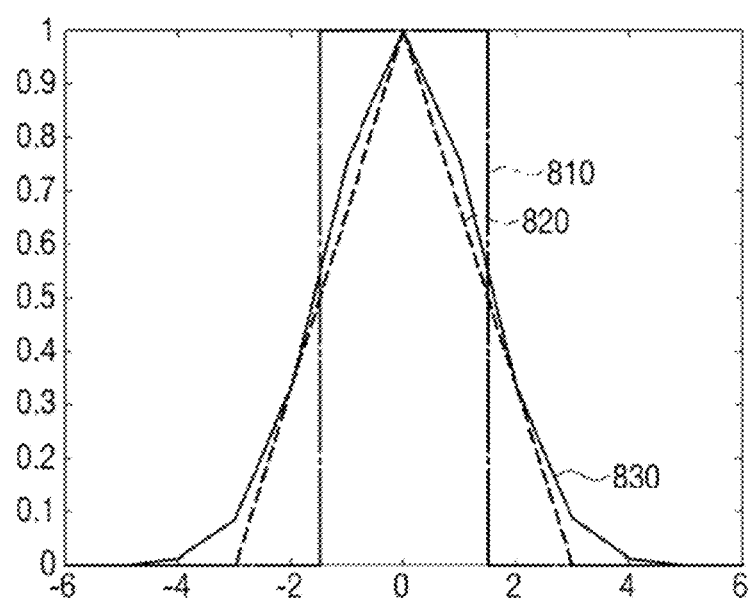
FIGS. 8 and 9 are views illustrating a difference between the related art and the disclosure.

FIGS. 8 and 9 are views illustrating a difference between the related art and the disclosure. Specifically, FIG. 8 illustrates a difference between the related art and the disclosure in an image domain, and FIG. 9 illustrates a difference between the related art and the disclosure in a frequency domain. Here, it is assumed that the scaling factor is 3 in both the related art and the disclosure. In addition, for convenience of explanation, only the right area of the reference pixel in which x is 0 will be described. Because the filters are bilaterally symmetrical, a description of the left area of the reference pixel is the same as the description of the right area of the reference pixel.

In the image domain of FIG. 8, a filter 810 of a nearest neighbor method, a filter 820 of a bilinear interpolation method, and a filter 830 in the form of a Gaussian function of the disclosure are illustrated.

In the nearest neighbor method, a value of an interpolated pixel is acquired as a pixel value of an adjacent original pixel. Referring to FIG. 8, the filter 810 of the nearest neighbor method may be a filter based on an original pixel whose x is 0 and may acquire a pixel value of an interpolated pixel whose x is 1 as a pixel value of an original pixel whose x is 0 which is a pixel adjacent to the pixel whose x is 1.

In other words, the filter 810 of the nearest neighbor method uses the pixel value of the reference pixel whose x is 0 only to obtain the pixel value of the adjacent pixel whose x is 1. Based on this, a size of the filter 810 of the nearest neighbor method may be 3 (including a reference pixel whose x is 0, an interpolated pixel whose x is 1, and an interpolated pixel whose x is −1).

Meanwhile, the filter of the bilinear interpolation method acquires a reflection ratio of a pixel value of an original pixel in accordance with a linear function based on a distance between an interpolated pixel and the original pixel and obtain a pixel value of the interpolated pixel based on the acquired reflection ratio. Referring to FIG. 8, the filter 820 of the bilinear interpolation method is a filter based on the original pixel whose x is 0, and the ratio of reflecting the pixel value of the original pixel linearly decreases according to a distance between the interpolated pixel and the original pixel whose x is 0. Accordingly, the pixel value of the interpolated pixel whose x is 1 may be acquired using ⅔ of the pixel value of the original pixel whose x is 0, and the pixel value of the interpolated pixel whose x is 2 may be acquired using ⅓ of the pixel value of the original pixel whose x is 0. Meanwhile, this is based on measurement of a distance based on a middle point of the pixel, and precisely, because the distance varies within the pixel, an average of reflection ratios that vary within one pixel may be used. In case of the pixel whose x is 1 and the pixel whose x is 2, the ratio based on the distance linearly decreases, and thus there is no problem even if the reflection ratio corresponding to the middle point of the pixel is used. However, in case of a pixel whose x is 3, the reflection ratio linearly decreases from a starting point to a middle point but is 0 from the middle point, and thus an average of reflection ratios in accordance with the distance from the starting point to the middle point of the pixel whose x is 3 with respect to the pixel whose x is 0 may be used as a reflection ratio of the pixel whose x is 3.

That is, a size of the filter 820 of the bilinear interpolation method may be 7 (including a reference pixel whose x is 0, interpolated pixels whose x is 1, 2, and 3, and interpolated pixels whose x is −1, −2, and −3).

Meanwhile, the filter 830 in the form of the Gaussian function of the disclosure may be acquired based on a scaling factor. Specifically, the Gaussian function type filter 830 may have a variance acquired based on the bilinear interpolation type filter 820 having the same scaling factor. Here, the Gaussian function type filter 830 may use the pixel value of the reference pixel whose x is 0 up to a pixel whose x is 6 due to the shape characteristic of the filter. Accordingly, the size of the Gaussian function type filter 830 may be 13 (including the reference pixel whose x is 0, the interpolated pixels whose x is 1, 2, 3, 4, 5, and 6, and the interpolated pixels whose x is −1, −2, −3, −4, −5, and −6).

As described above, when the Gaussian function type filter of the disclosure is used, the pixel values of the interpolated pixels may be acquired using the pixel values of the original pixels in a wider range. In addition, the reflection ratio of the pixel value of the reference pixel gradually decreases according to distances to the neighboring pixels, and compared with the bilinear interpolation type filter, the pixel value of the pixel which is closer is used more frequently and the pixel value of a pixel which is away is used less frequently. Therefore, according to the disclosure, a more improved high-quality image may be generated.

Meanwhile, FIG. 9 shows a result of analyzing an enlarged image acquired using the nearest neighbor type filter 910, the bilinear interpolation type filter 920, and the Gaussian function type filter 930 of the disclosure in the frequency domain.

Referring to FIG. 9, it can be seen that boosting occurs in a high frequency region when the nearest neighbor type filter 910 and the bilinear interpolation type filter 920 are used. As a result, artifacts occur in the enlarged image.

In contrast, in case of using the Gaussian function type filter 930, boosting does not occur even in the high frequency region, and thus it can be seen that artifacts in the enlarged image are reduced.

Figure 10:
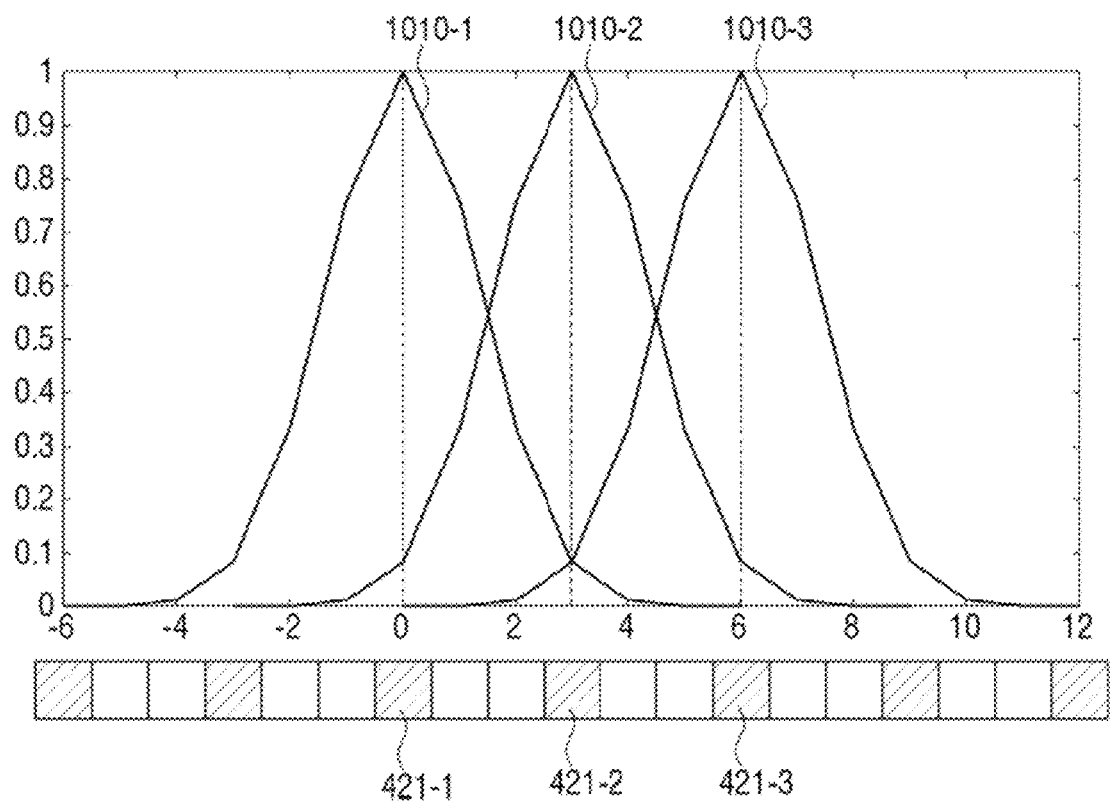
FIG. 10 is a view illustrating an interpolation method using a plurality of pixels of an input image according to an embodiment of the disclosure.

FIG. 10 is a view illustrating an interpolation method using a plurality of pixels of an input image according to an embodiment of the disclosure.

Referring to FIG. 10, pixel values of a plurality of pixels in an enlarged image may be acquired using pixel values of a plurality of original pixels 421-1, 421-2, and 421-3. Specifically, reflection ratios of the pixel values of the original pixels may be identified according to distances to the respective original pixels on a first Gaussian function 1010-1 based on the first original pixel 421-1, a second Gaussian function 1010-2 based on the second original pixel 421-2, and a third Gaussian function 1010-3 based on the third original pixel 421-3.

That is, the original pixels or interpolated pixels configuring the enlarged image may be acquired by overlapping the reflection ratio of the pixel value of the first original pixel 421-1 identified according to the distance to the first original pixel 421-1 on the first Gaussian function 1010-1, the reflection ratio of the pixel value of the second original pixel 421-2 identified according to the distance to the second original pixel 421-2 on the second Gaussian function 1010-2, and the reflection ratio of the pixel value of the third original pixel 421-3 identified according to the distance to the third original pixel 421-3 on the third Gaussian function 1010-3.

Meanwhile, in FIG. 10, for convenience of explanation, Gaussian functions corresponding to original pixels other than the first to third original pixels 421-1 to 421-3 are not shown, but in actual realization, pixel values of the original pixels and the interpolated pixels of the enlarged image may be acquired based on Gaussian functions respectively corresponding to all the original pixels of an input image.

Figure 11:
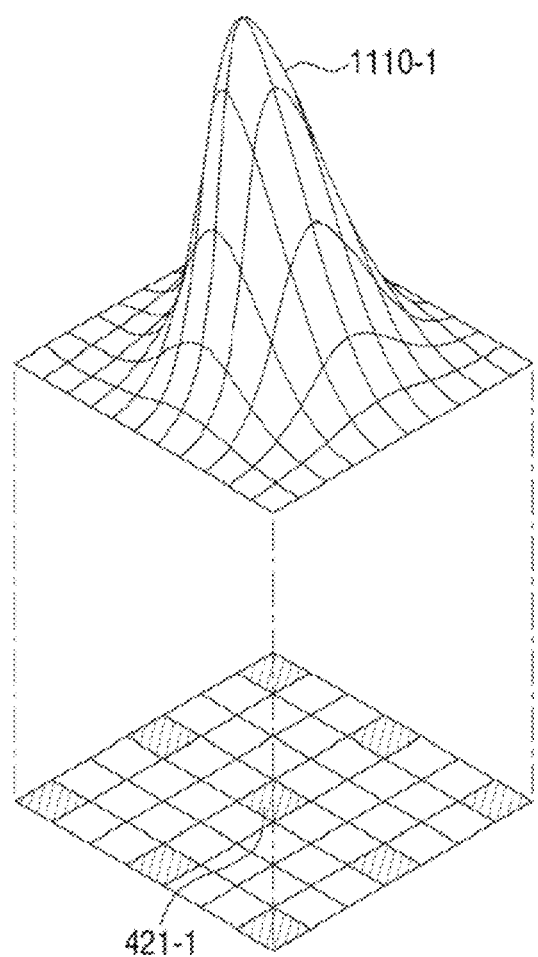
FIG. 11 is a diagram illustrating the interpolation method of FIG. 6 in a 3D domain.

FIG. 11 is a view illustrating the interpolation method of FIG. 6 in a 3D domain. Specifically, FIG. 6 shows that the pixel value of the reference original pixel 421-1 is used only for the pixel values of the left and right interpolated pixels and the original pixel, but in actuality, as shown in FIG. 11, the pixel value of the reference original pixel 421-1 may also be used for pixel values of upper and lower interpolated pixels and the original pixel and pixel values of diagonal interpolated pixels and the original pixel.

Referring to FIG. 11, a Gaussian function 1110-1 may be in the form of a 3D Gaussian function based on the reference original pixel 421-1. Pixel values of interpolated pixels around the reference original pixel 421-1 and other original pixels may be acquired by reflecting the pixel value of the reference original pixel 421-1 by a ratio identified according to the distance to the reference original pixel 421-1.

Meanwhile, in FIG. 11, for convenience of explanation, the pixels of the enlarged image are shown as 7 by 7, but a range of pixels in which the pixel value of the reference original pixel 421-1 is used may be 13 by 13 with respect to the reference original pixel 421-1 as shown in FIG. 6.

Figure 12:
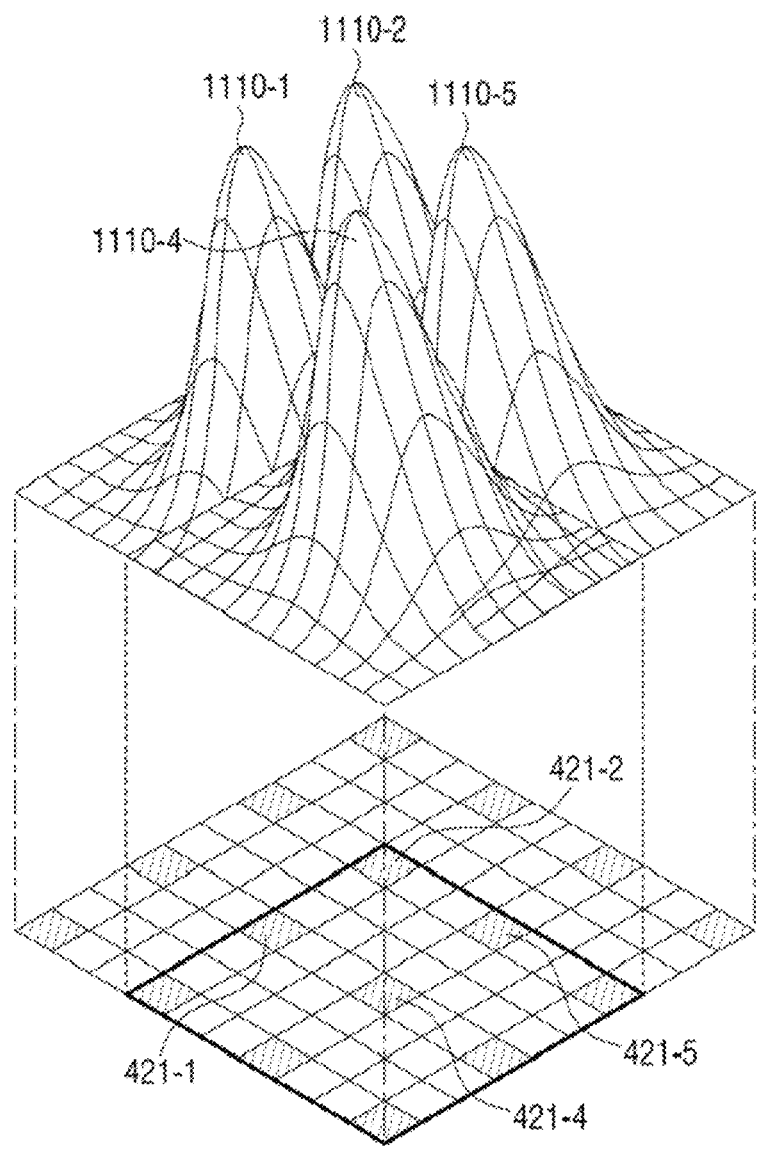
FIG. 12 is a diagram illustrating the interpolation method of FIG. 10 in a 3D domain.

FIG. 12 is a view illustrating the interpolation method of FIG. 10 in a 3D domain. Specifically, in FIG. 10, it is illustrated that pixel values of a plurality of original pixels included in the same row or column are used to acquire a pixel value of an original pixel or an interpolated pixel of an enlarged image, but in actuality, pixel values of a plurality of original pixels included in different rows or columns may also be used. Here, the Gaussian function based on each original pixel may have a 3D form.

Specifically, the original pixels or interpolated pixels configuring the enlarged image may be acquired by overlapping a reflection ratio of a pixel value of a first original pixel 421-1 identified according to a distance to the first original pixel 421-1 on the first Gaussian function 1110-1, a reflection ratio of a pixel value of a second original pixel 421-2 identified according to a distance to the second original pixel 421-2 on the second Gaussian function 1110-2, a reflection ratio of a pixel value of a fourth original pixel 421-4 identified according to a distance to the fourth original pixel 421-4 on the fourth Gaussian function 1110-4, and a reflection ratio of a pixel value of a fifth original pixel 421-5 identified according to a distance to the fifth original pixel 421-5 on the fifth Gaussian function 1110-5.

Figure 13:
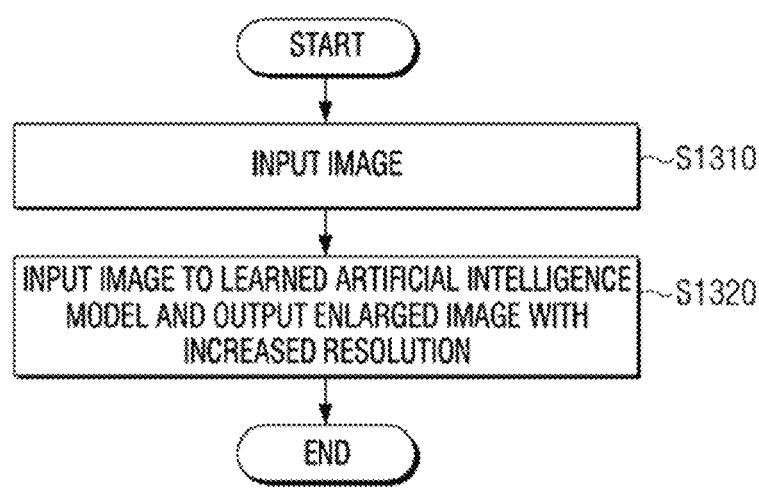
FIG. 13 is a flowchart schematically illustrating an image processing method according to an embodiment of the disclosure.

FIG. 13 is a flowchart schematically illustrating an image processing method according to an embodiment of the disclosure.

First, an electronic device may receive an image (S1310). Specifically, the electronic device may receive an image from an external device or may receive an image stored in a memory of the electronic device.

Next, the electronic device may input the input image to a learned artificial intelligence model and output an enlarged image having increased resolution (S1320). Specifically, the artificial intelligence model includes an upscaling module, and the upscaling module may acquire a pixel value of an interpolated pixel near an original pixel according to a Gaussian function based on the original pixel corresponding to a pixel of the input image.

Here, the upscaling module may identify a reflection ratio of the pixel value of the original pixel according to a distance between the original pixel and the interpolated pixel on the Gaussian function based on the original pixel. In addition, the upscaling module may acquire the pixel value of the interpolated pixel using the identified reflection ratio.

Figure 14:
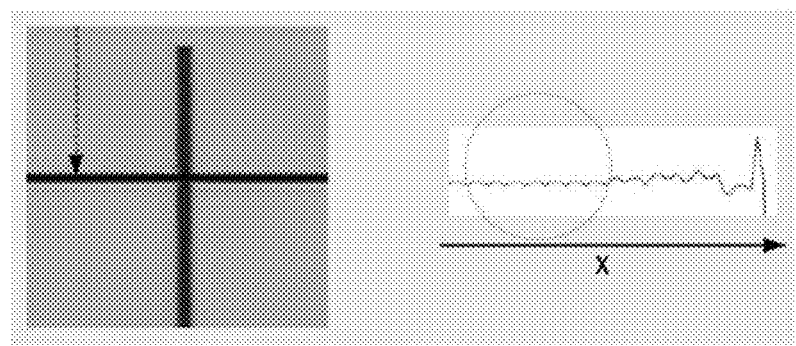
FIG. 14 is a view comparing enlarged images acquired according to the related art and an image processing method according to an embodiment of the disclosure.
Figure 14:
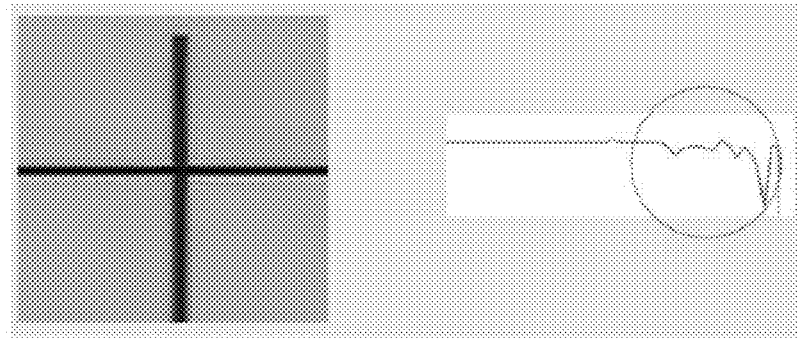
Figure 14:
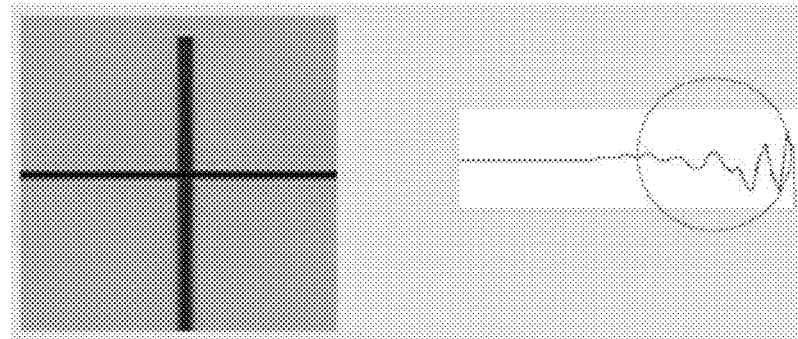
Figure 14:
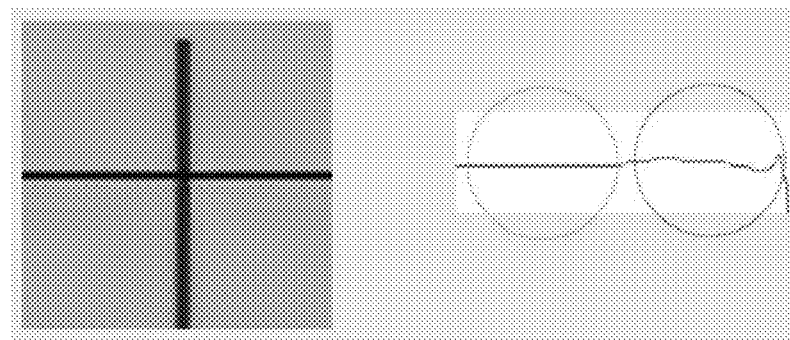

FIG. 14 is a view comparing enlarged images acquired according to the related art and an image processing method according to an embodiment of the disclosure.

FIG. 14 shows results of analyzing frequencies of the images in the x direction from the boundary of the enlarged image to the black line, which is the center of the images, as shown in FIG. 14A.

Specifically, FIGS. 14A to 14C show the enlarged image acquired according to the related art and the analysis results and FIG. 14d shows the enlarged image acquired according to the disclosure and the analysis results. Here, FIG. 14A shows an enlarged image acquired by a deconvolution method, FIG. 14B shows an enlarged image acquired by a nearest neighbor method, and FIG. 14C shows an enlarged image acquired by a bilinear interpolation method.

Referring to FIG. 14A, it can be seen that the frequency of the enlarged image forms a wave shape at a certain period and mosaic-shaped artifacts occurred. Referring to FIGS. 14B and 14C, it can be seen that the frequency fluctuates in an edge region between a gray surface and a black line, and thus ringing artifacts occurred in the edge region.

Meanwhile, referring to FIG. 14D, it can be seen that the frequency is even in the gray area and there is no fluctuation of the frequency in the edge area between the gray surface and the black line, and thus the edge in the enlarged image is clear. In other words, it can be seen that an improved high-quality image is acquired, compared to the related art.

According to the various embodiments described above, when the Gaussian function type filter is used, pixel values of interpolated pixels may be acquired using a pixel value of an original pixel of a wider range. In addition, the reflection ratio of the pixel value of the reference pixel gradually decreases according to distances to the neighboring pixels, and compared with the bilinear interpolation type filter, the pixel values of the pixels which are closer are used more frequently and the pixel values of the pixels which are away are used less frequently. Therefore, according to the disclosure, an improved high-quality image may be generated.

Meanwhile, various embodiments described above may be realized in a computer or similar device-readable recording medium using software, hardware, or a combination thereof. In case of implementation by hardware, embodiments described in the disclosure may be realized using at least one of application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electronic units performing other functions. In some cases, embodiments described in the disclosure may be realized by the processor 120 itself. In case of software implementation, embodiments such as procedures and functions described in the disclosure may be realized as separate software modules. Each of the software modules may perform one or more functions and operations described in the disclosure.

Meanwhile, the image processing method according to various embodiments described above may be stored in a non-transitory readable medium. Such a non-transitory readable medium may be installed and used in a variety of devices.

Such a non-transitory readable medium is not a medium for storing data for a short time such as a register, cache or memory, but refers to a medium that semi-permanently stores data and may be read by a device. Specifically, programs for performing various methods described above may be stored in the non-transitory readable medium may include a CD, DVD, hard disk, Blu-ray disc, USB, memory card, ROM, and the like, and provided.

According to embodiments, the methods according to various embodiments disclosed in this document may be included in a computer program product and provided. The computer program product may be traded as goods between a seller and a purchaser. The computer program product may be distributed as a device-readable storage medium (e.g., compact disk read only memory (CD-ROM)) or online through an application store (e.g., Play Store™). In case of online distribution, at least part of the computer program product may be temporarily stored or temporarily created in a storage medium such as a server of a manufacturer, a server of an application store, or a memory of a relay server.

Hereinabove, the embodiment of the disclosure has been described but the disclosure is not limited to the specific embodiment and may be variously modified by a person skilled in the art to which the disclosure pertains without departing from the scope of the disclosure as claimed in the appended claims and such modifications should not be individually understood from technical concepts or prospects of the disclosure.

The invention claimed is:

1. An electronic device comprising:
a memory storing a learned artificial intelligence model, and at least one programmed instruction; and
a processor configured to execute the at least one programmed instruction to:
input an input image to the artificial intelligence model,
wherein the learned artificial intelligence model includes an upscaling module configured to calculate a pixel value of an interpolated pixel near an original pixel corresponding to a pixel of the input image based on a Gaussian function in a form which is bilaterally symmetrical and nonlinearly decreases with respect to the original pixel,
wherein the upscaling module calculates the pixel value of the interpolated pixel near a plurality of original pixels based on a ratio at which a plurality of original pixel values are reflected in the pixel value of the interpolated pixel, and the ratio is identified according to distances between the plurality of original pixels and the interpolated pixel, on a plurality of Gaussian functions based on the plurality of original pixels, and
output electronically an enlarged image with increased resolution based on the pixel value of the interpolated pixel calculated by the upscaling module.

2. The electronic device as claimed in claim 1, wherein the plurality of original pixels correspond to one pixel of the input image in the enlarged image, at least one of a plurality of pixels adjacent to the one pixel, and a pixel corresponding to at least one of a plurality of pixels which are spaced apart to the one pixel but are adjacent to the plurality of pixels.

3. The electronic device as claimed in claim 2, wherein a variance of the Gaussian function is calculated based on a linear function for bilinear interpolation of an upscaling factor, wherein the upscaling factor corresponds a magnification of the enlarged image compared to the input image.

4. The electronic device as claimed in claim 3, wherein a variance $\sigma_d$ of the Gaussian function is calculated by $$\sigma_d(s) = sqrt\left(\frac{-d^2}{2\ln\left(\frac{-4d}{t(s)-1}+1\right)}\right),$$

where s is the upscaling factor, d is an x coordinate of a contact point between the linear function and the Gaussian function, and t(s) is a value calculated by adding 1 to a distance between x intercepts of the Gaussian function.

5. The electronic device as claimed in claim 4, wherein the Gaussian function is $$f(x;s) = \exp\left(-\frac{x^2}{2\sigma(s)^2}\right)$$

and $\sigma_d(s)-s*0.1 \leq \sigma(s) \leq \sigma_d(s)+s*0.1$.

6. The electronic device as claimed in claim 1, wherein the upscaling module further includes a convolution filter configured to calculate a feature of the input image.

7. An image processing method comprising:
receiving an image;
inputting an input image to a learned artificial intelligence model,
wherein the learned artificial intelligence model includes an upscaling module configured to calculate a pixel value of an interpolated pixel near an original pixel corresponding to a pixel of the input image based on a Gaussian function in a form which is bilaterally symmetrical and nonlinearly decreases with respect to the original pixel, and
wherein the upscaling module calculates the pixel value of the interpolated pixel near a plurality of original pixels based on a ratio at which a plurality of original pixel values are reflected in the pixel value of the interpolated pixel, and the ratio is identified according to distances between the plurality of original pixels and the interpolated pixel, on a plurality of Gaussian functions based on the plurality of original pixels; and
outputting electronically, an enlarged image with increased resolution based on the pixel value of the interpolated pixel calculated by the upscaling module.

8. The image processing method as claimed in claim 7, wherein
the plurality of original pixels correspond to one pixel of the input image in the enlarged image, at least one of a plurality of pixels adjacent to the one pixel, and a pixel corresponding to at least one of a plurality of pixels which are spaced apart to the one pixel but are adjacent to the plurality of pixels.

9. The image processing method as claimed in claim 8, wherein
a variance of the Gaussian function is calculated based on a linear function for bilinear interpolation of an upscaling factor, wherein the upscaling factor corresponds a magnification of the enlarged image compared to the input image.

10. The image processing method as claimed in claim 9, wherein
a variance $\sigma_d$ of the Gaussian function is calculated by $$\sigma_d(s) = sqrt\left(\frac{-d^2}{2\ln\left(\frac{-4d}{t(s)-1}+1\right)}\right),$$

where s is the upscaling factor, d is an x coordinate of a contact point between the linear function and the Gaussian function, and t(s) is a value calculated by adding 1 to a distance between x intercepts of the Gaussian function.

11. The image processing method as claimed in claim 10, wherein
the Gaussian function is $$f(x;s) = \exp\left(-\frac{x^2}{2\sigma(s)^2}\right)$$

and $\sigma_d(s)-s*0.1 \leq \sigma(s) \leq \sigma_d(s)+s*0.1$.

12. The image processing method as claimed in claim 6, wherein
the upscaling module further includes a convolution filter configured to calculate a feature of the input image.

13. A non-transitory computer-readable recording medium including a program for executing an image processing method,
    wherein the image processing method includes:
    receiving an image; and
    inputting an input image to a learned artificial intelligence model,
    wherein the learned artificial intelligence model includes an upscaling module configured to calculate a pixel value of an interpolated pixel near an original pixel corresponding to a pixel of the input image based on a Gaussian function in a form which is bilaterally symmetrical and nonlinearly decreases with respect to the original pixel, and
    wherein the upscaling module calculates the pixel value of the interpolated pixel near a plurality of original pixels based on a ratio at which a plurality of original pixel values are reflected in the pixel value of the interpolated pixel, and the ratio is identified according to distances between the plurality of original pixels and the interpolated pixel, on a plurality of Gaussian functions based on the plurality of original pixels; and
    outputting electronically, an enlarged image with increased resolution based on the pixel value of the interpolated pixel calculated by the upscaling module.

* * * * *